US012410888B2

(12) United States Patent
McBride et al.

(10) Patent No.: US 12,410,888 B2
(45) Date of Patent: Sep. 9, 2025

(54) NON-CIRCULAR PRESSURE VESSEL

(71) Applicant: MAGNA INTERNATIONAL INC., Aurora (CA)

(72) Inventors: James McBride, Troy, MI (US); William Perry, Troy, MI (US)

(73) Assignee: MAGNA INTERNATIONAL INC., Aurora (CA)

( * ) Notice: Subject to any disclaimer, the term of this patent is extended or adjusted under 35 U.S.C. 154(b) by 0 days.

(21) Appl. No.: 18/439,374

(22) Filed: Feb. 12, 2024

(65) Prior Publication Data

US 2024/0263739 A1 Aug. 8, 2024

Related U.S. Application Data

(63) Continuation of application No. 17/259,582, filed as application No. PCT/US2019/041572 on Jul. 12, 2019, now abandoned.

(Continued)

(51) Int. Cl.
*F17C 1/08* (2006.01)
*F17C 1/14* (2006.01)
*F17C 13/06* (2006.01)

(52) U.S. Cl.
CPC .................. *F17C 1/14* (2013.01); *F17C 1/08* (2013.01); *F17C 13/06* (2013.01);
(Continued)

(58) Field of Classification Search
CPC .......... F17C 2205/01; F17C 2205/0153; F17C 2203/012; F17C 2209/2181; F17C 2223/0123; F17C 2201/0128; F17C 2201/0152; F17C 2205/0169; F17C 2205/0123
See application file for complete search history.

(56) References Cited

U.S. PATENT DOCUMENTS

2006/0033322 A1* 2/2006 Suess ..................... B60K 15/07 280/830
2008/0237240 A1* 10/2008 Hausberger ............... F17C 3/08 220/560.07

(Continued)

OTHER PUBLICATIONS

U.S. Appl. No. 17/259,582 filed Jan. 12, 2021, Pending.

*Primary Examiner* — Stephen J Castellano
(74) *Attorney, Agent, or Firm* — Dickinson Wright PLLC

(57) ABSTRACT

A reservoir assembly includes one or more pressure vessels each having a non-circular cross-sectional shape including a rounded rectangle having four generally flat sides with rounded corners. The pressure vessels may be formed of extruded metal, such as aluminum, and have a generally constant cross-section. The pressure vessels include stiffening ribs and varying wall thicknesses to improve strength and to minimize stresses when pressurized, such as during operation when filled with compressed gas. The stiffening ribs meet in the center of each of the pressure vessels and divide the interior volumes into four equal sections. A cap of stamped aluminum is fitted and fully welded to enclose each end of the pressure vessels. One or both of the caps on each of the pressure vessels has a pressure fitting. Two or more pressure vessels extend parallel to one another and are attached together to form the reservoir assembly.

14 Claims, 9 Drawing Sheets

Related U.S. Application Data

(60) Provisional application No. 62/696,897, filed on Jul. 12, 2018.

(52) U.S. Cl.
CPC ................. *F17C 2201/0128* (2013.01); *F17C 2201/0152* (2013.01); *F17C 2203/012* (2013.01); *F17C 2203/0646* (2013.01); *F17C 2209/2181* (2013.01); *F17C 2209/221* (2013.01); *F17C 2209/224* (2013.01); *F17C 2209/232* (2013.01); *F17C 2209/234* (2013.01); *F17C 2223/0123* (2013.01)

(56) References Cited

U.S. PATENT DOCUMENTS

| | | | | |
|---|---|---|---|---|
| 2011/0139796 | A1* | 6/2011 | Lukiyanets | F17C 1/06 220/581 |
| 2017/0343160 | A1* | 11/2017 | Garosshen | F17C 1/16 |
| 2024/0123777 | A1* | 4/2024 | Thompson | F17C 1/00 |

* cited by examiner

NON-CIRCULAR PRESSURE VESSEL

CROSS-REFERENCE TO RELATED APPLICATIONS

This Continuation patent application claims the benefit of U.S. National Stage patent application Ser. No. 17/259,582, filed Jan. 12, 2021, which claims the benefit of PCT International Patent Application Serial No. PCT/US2019/041572 filed Jul. 12, 2019 entitled "NON-CIRCULAR PRESSURE VESSEL," which claims the benefit of U.S. Provisional Patent Application Ser. No. 62/696,897 filed on Jul. 12, 2018, and titled "Non-Circular Pressure Vessel", the entire disclosures of which are hereby incorporated by reference.

FIELD

The present disclosure relates generally to pressure vessels such as reservoir tanks for holding a fluid such as compressed air or other gas. Specifically, the present disclosure relates to such pressure vessels having a non-circular cross-section.

BACKGROUND

Pressure vessels made of extruded metal are commonly constructed having a circular cross-section, which may be produced using drawn-over mandrel extrusions. Such circular pressure vessels are generally good at withstanding elevated pressures of fluid contained therein. However, circular pressure vessels are not optimized for containment volume, particularly where packing requirements are generally rectangular. This causes packaging inefficiencies, which can render circular pressure vessels to be unsuitable where rectangular packaging space must be optimized to meet specific design requirements.

SUMMARY

A reservoir assembly includes one or more pressure vessels having a non-circular shape. More specifically, one or more of the pressure vessels of the reservoir assembly have a cross-sectional shape of a rounded rectangle, having four generally flat sides with rounded corners. The pressure vessels may be formed of extruded metal, such as aluminum, and may have a generally constant cross-section.

In accordance with an aspect of the disclosure, the non-circular pressure vessels may each include one or more stiffening ribs.

In accordance with another aspect of the disclosure, the non-circular pressure vessels may have varying wall thicknesses to improve strength and to minimize stresses when pressurized.

In accordance with another aspect of the disclosure, a cap of stamped metal may enclose each end of each of the non-circular pressure vessels.

BRIEF DESCRIPTION OF THE DRAWINGS

Further details, features and advantages of designs of the invention result from the following description of embodiment examples in reference to the associated drawings.

DETAILED DESCRIPTION

Figure 1:
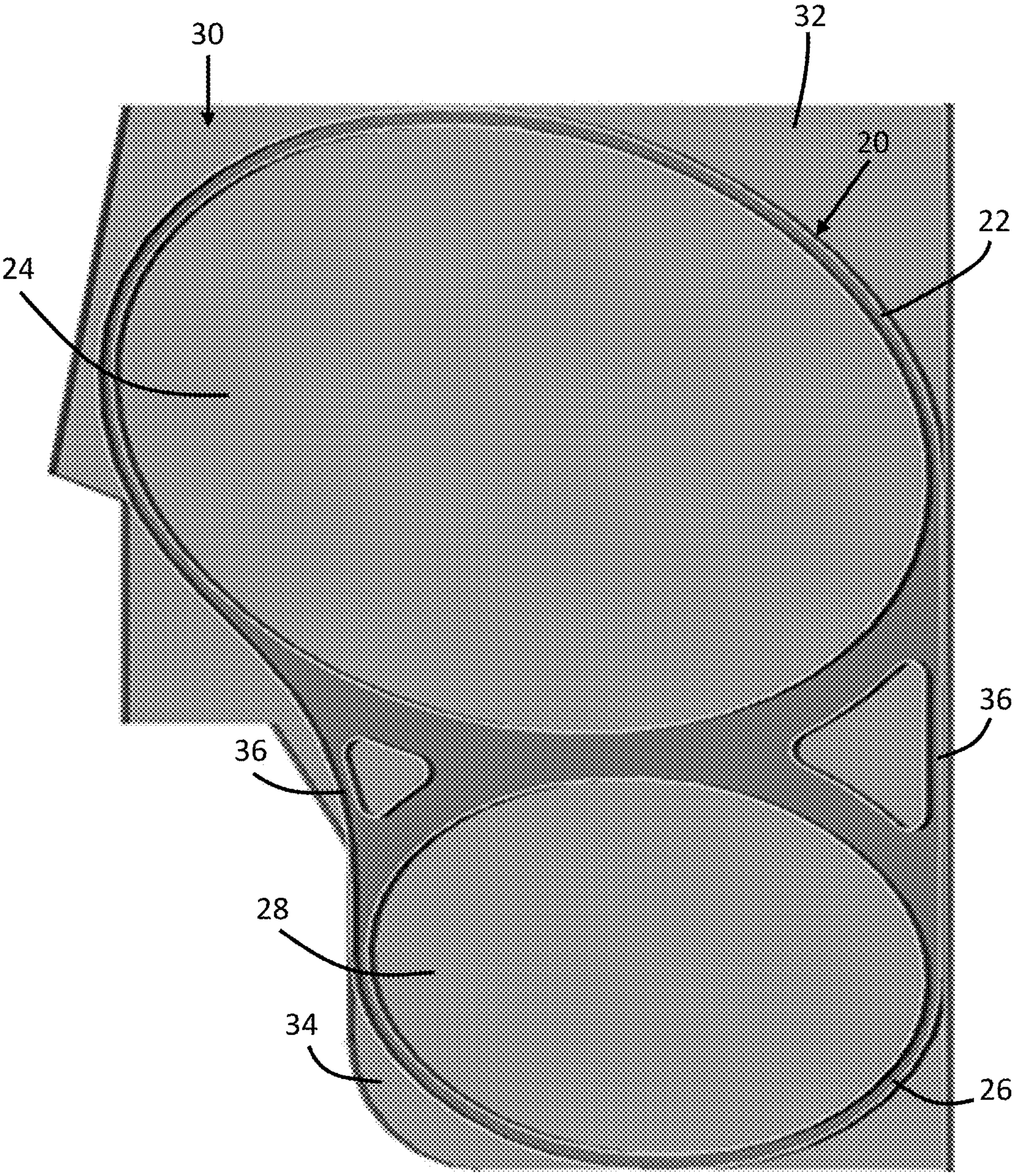
FIG. 1 is a cross-sectional view of a reservoir assembly with pressure vessels having oval-shaped cross-sections and fitting within an irregularly-shaped space in accordance with an embodiment of the present disclosure.

Recurring features are marked with identical reference numerals in the figures, in which example embodiments of a reservoir assembly 20 are disclosed.

As shown in the cross-sectional view of FIG. 1, a reservoir assembly 20 includes a first pressure vessel 22 enclosing a first volume 24 for holding a pressurized fluid, such as compressed air. The reservoir assembly 20 also includes a second pressure vessel 26 enclosing a second volume 28 for holding a pressurized fluid, such as compressed air. The two pressure vessels 22, 26 may be isolated from one another for example, to contain different fluids or for containing fluid at two different pressures. Alternatively, the two pressure vessels 22, 26 may be in fluid communication with one another to provide a larger capacity than either of them alone.

As also shown in FIG. 1, the two pressure vessels 22, 26 may have different sizes, with the first pressure vessel 22 being larger than the second pressure vessel 26. This provides for the reservoir assembly 20 to fit within an irregularly-shaped space 30 having a first region 32 holding the first pressure vessel 22, and a second region 34 that is smaller than the first region 32 and which holds the second pressure vessel 26. Each of the regions 32, 34 of the irregularly-shaped space 30 may be generally rectangular, and adjoining one another. Some irregularities, such as angles and rounded portions may be present on one or more edges and/or corners of the irregularly-shaped space 30. Brackets 36 join the pressure vessels 22, 26 and may be integrally formed therewith, for example, as a single extrusion with the pressure vessels 22, 26. The pressure vessels 22, 26 of the reservoir assembly 20 shown in the embodiment of FIG. 1, each have an oval-shaped cross-section.

Design requirements may call for each of the pressure vessels 22, 26 to have different volumes. In some embodiments, the second volume 28 enclosed by the second pressure vessel 26 may be between 25% and 50% of the first volume 24 that is enclosed by the first pressure vessel 22. In one example, the first volume 24 may be about 11 L, and the second volume 28 may be about 4 L. Each of the pressure vessels 22, 26 have a design operating pressure that may be the same or different for the two pressure vessels 22, 26. The operating pressure may be between 5 and 20 Bar. Likewise, each of the pressure vessels 22, 26 have maximum rated burst pressure. The maximum rated burst pressure may be about three (3) times the operating pressure. In some embodiments, the maximum rated burst pressure may be between 30 and 50 Bar. For example, one or both of the pressure vessels 22, 26 may have maximum rated burst pressure of 35 Bar. The combination of design operating pressure, maximum burst pressure, and packaging constraints of the irregularly-shaped space 30, may preclude use of oval-shaped cross-sections for the pressure vessels 22, 26.

Figure 2:
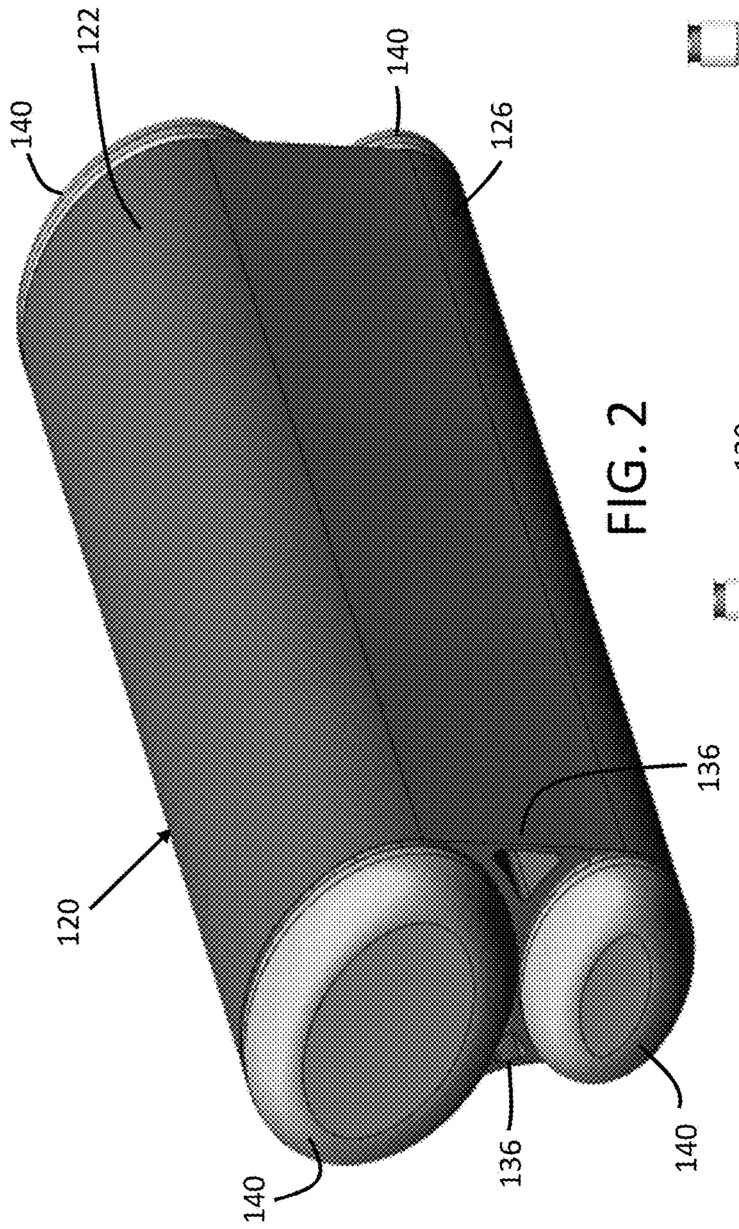
FIG. 2 is a profile view of a reservoir assembly with pressure vessels having generally circular cross-sections in accordance with another embodiment of the present disclosure.

Another embodiment of a reservoir assembly 120 is shown in profile view in FIG. 2. The reservoir assembly 120 includes two pressure vessels 122, 126 having a generally circular cross-section, and which are integrally formed with brackets 136 between them as a single extruded piece, which may be formed, for example, of extruded aluminum. The two pressure vessels 122, 126, and the brackets 136 may together define a constant cross-section of the reservoir assembly 120 and which extends entirely along a length of the reservoir assembly 120 between two opposite ends of the pressure vessels 122, 126. FIG. 2 also shows caps 140 attached to the ends of each of the pressure vessels 122, 126 to enclose the interior volumes 24, 28 within them. The caps 140 may be formed, for example, of stamped aluminum that is welded around the ends of each of the pressure vessels 122, 126.

Figure 3A:
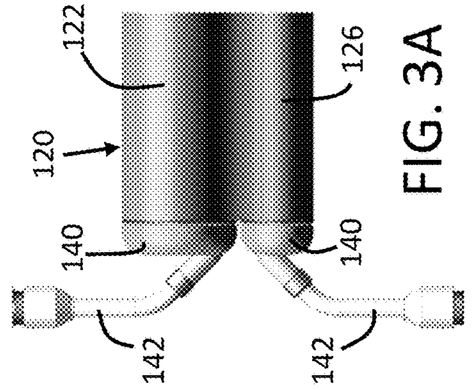
FIG. 3A is a top view of the reservoir assembly embodiment of FIG. 2 with welders.
Figure 3B:
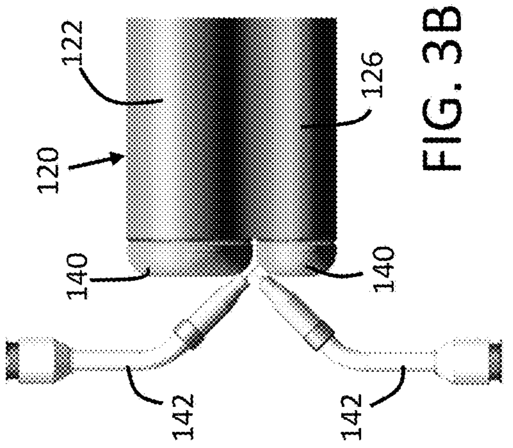
FIG. 3B is another top view of the reservoir assembly embodiment of FIG. 2 with welders.

As illustrated in FIGS. 3A and 3B, the reservoir assembly 120 embodiment shown in FIG. 2 may present challenges in access for welders 142 needed to weld the caps 140 to the ends of each of the pressure vessels 122, 126. This may inhibit the ability to complete a weld 360-degrees, completely around each of the caps 140. In order to provide clearance required for welding, the radius of the caps 140 or the distance between each of the pressure vessels 122, 126 would have to be increased. Each of those options would significantly reduce the volume within the pressure vessels 122, 126.

Figure 4:
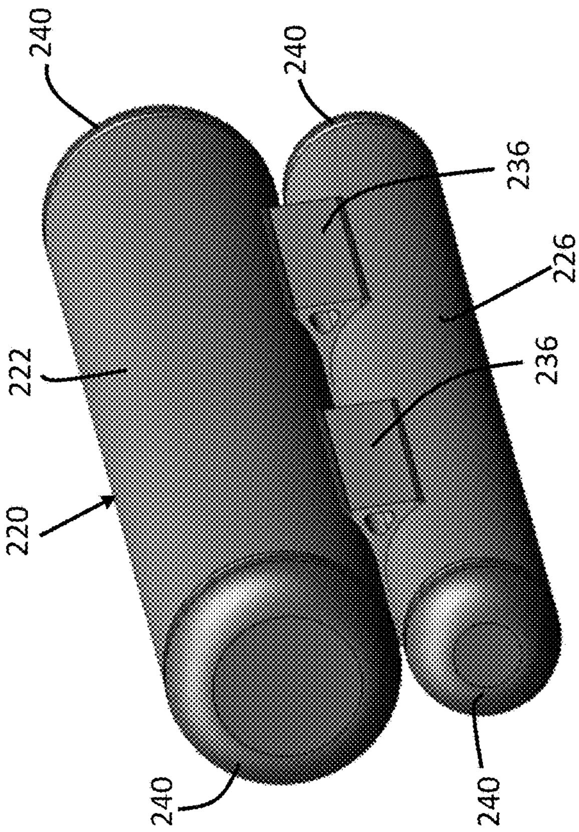
FIG. 4 is a profile view of another embodiment of a reservoir assembly with pressure vessels having circular cross-sections.

Another embodiment a reservoir assembly 220 is shown in profile view in FIG. 4. The reservoir assembly 220 includes two pressure vessels 222, 226 having a generally circular cross-section, and which are formed separately, with caps 240 installed on the ends of each of the pressure vessels 222, 226, which are joined with brackets 236 between them. The pressure vessels 222, 226, may each be, for example, a segment of extruded aluminum tube. The caps 240 may be welded in a 360-degree weld around each of the ends of the pressure vessels 222, 226. Once the caps 240 are joined to the pressure vessels 222, 226, the pressure vessels 222, 226 may be joined to one-another, for example, by welding each of them to one or more brackets 236. The reservoir assembly 220 illustrated in FIG. 4 includes two brackets 236 between the pressure vessels 222, 226.

Figure 5:
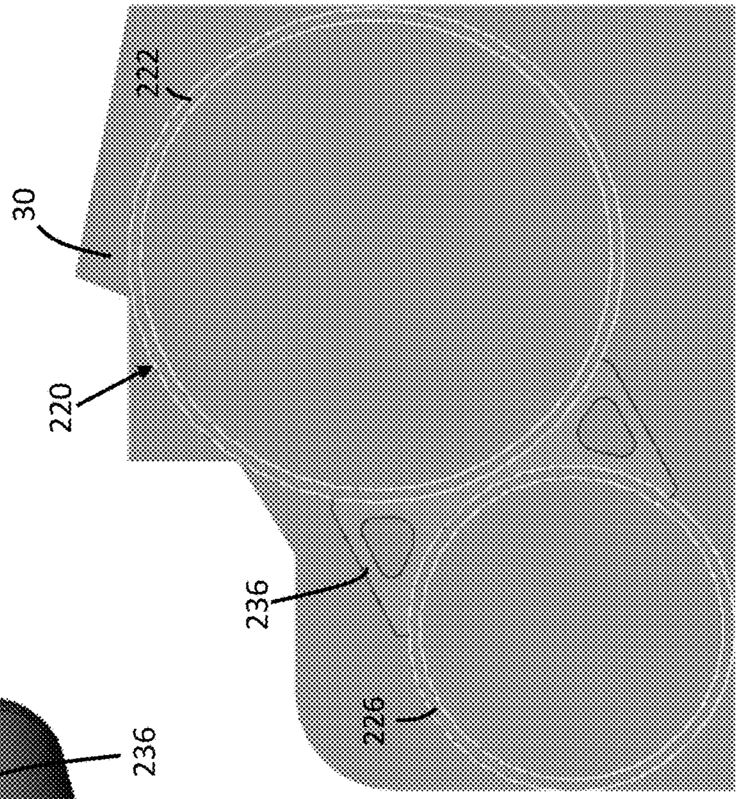
FIG. 5 is a cross-sectional view of a reservoir assembly with pressure vessels having circular cross-sections and fitting within the irregularly-shaped space in accordance with an aspect of the present disclosure.

As shown in FIG. 5, the reservoir assembly 220 of FIG. 4, with pressure vessels 222, 226 having circular cross-sections, is shown within the irregularly-shaped space 30. FIG. 5 illustrates the reservoir assembly 220 not substantially filling the particular irregularly-shaped space 30 provided.

Figure 6:
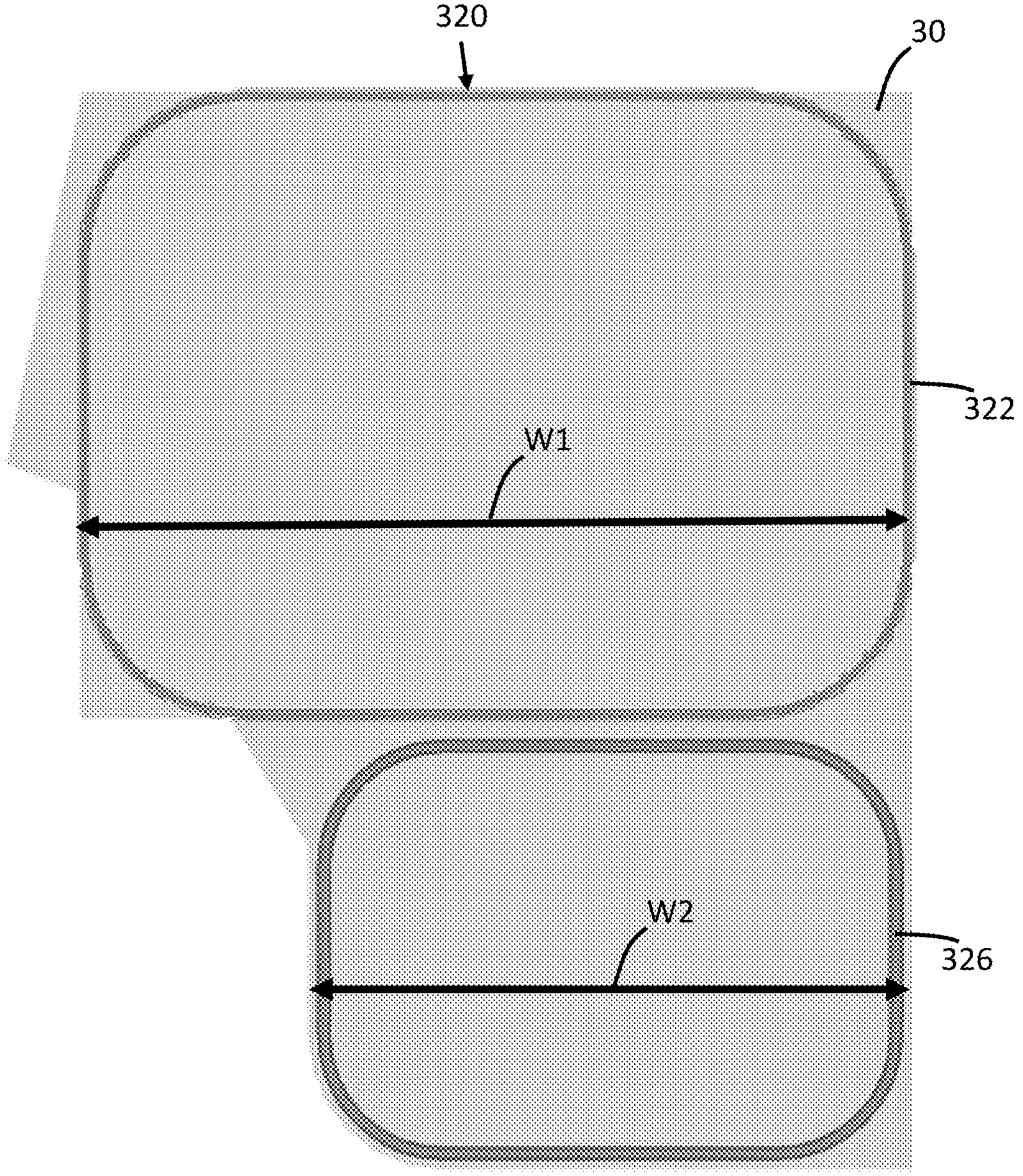
FIG. 6 is a is a cross-sectional view of a reservoir assembly with pressure vessels having rounded rectangle shaped cross-sections and fitting within an irregularly-shaped space in accordance with another embodiment of the present disclosure.

FIG. 6 illustrates a cross-sectional view of another embodiment for a reservoir assembly 320 that includes pressure vessels 322, 326 each having a non-circular shape. More specifically, the pressure vessels 322, 326 of the reservoir assembly 320 are each shaped as rounded rectangles, having four generally flat sides with rounded, or radiused corners. The pressure vessels 322, 326 may be formed of extruded metal, such as aluminum, and may have a generally constant cross-section. The radius of the rounded corners may be determined by the pressure requirements, such as operating pressure, and/or maximum burst pressure of the pressure vessels 322, 326. As shown in FIG. 6, the irregularly-shaped space 30 includes a first region with a first width W1 and holding the first pressure vessel 322, and a second region with a second width W2 that is smaller than the first width W1 of the first region and which holds the second pressure vessel 326. The first pressure vessel 322 is wider than the second width W2 of the second region. This reservoir assembly 320 embodiment provides for a more substantial filling of the irregularly-shaped space 30, therefore allowing the reservoir assembly 320 to meet the design requirements for volumetric capacity, while fitting within the packaging requirements in the irregularly-shaped space 30.

Figure 7B:
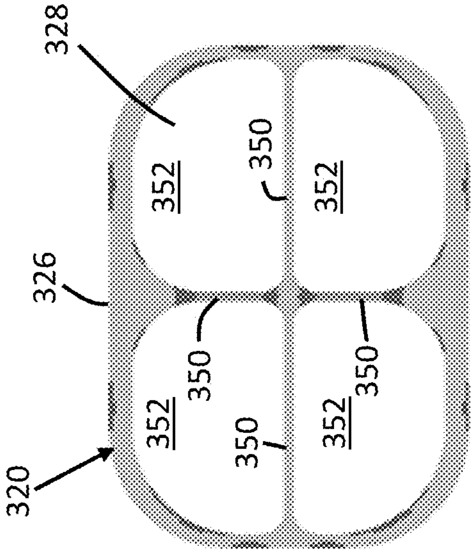
FIG. 7B is a cross-sectional CAE view of a second pressure vessel having rounded rectangle shaped cross-sections with stiffening ribs and with varying wall thicknesses and illustrating internal stresses therein.
Figure 7A:
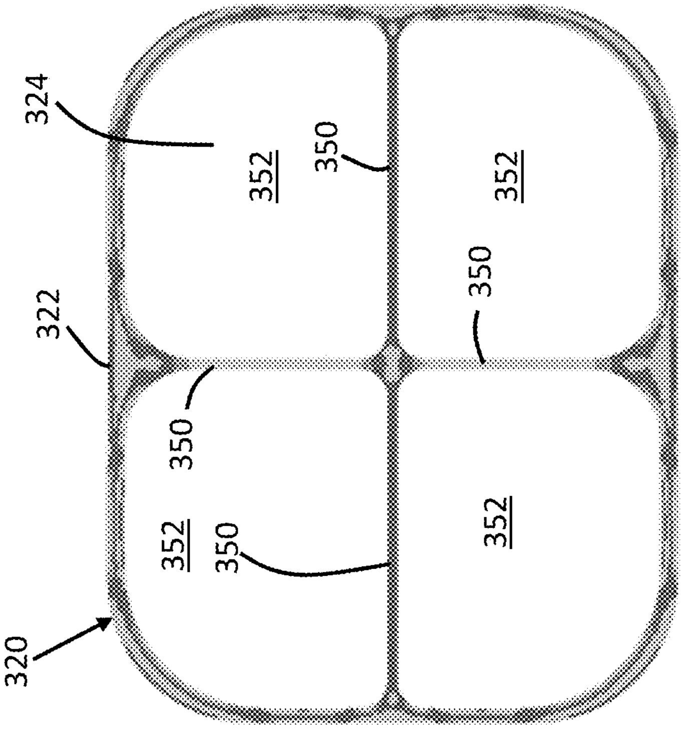
FIG. 7A is a cross-sectional CAE view of a first pressure vessel having rounded rectangle shaped cross-sections with stiffening ribs and with varying wall thicknesses and illustrating internal stresses therein.

FIGS. 7A and 7B show Computer-Aided Engineering (CAE) studies of the reservoir assembly 320 that includes pressure vessels 322, 326 with the addition of stiffening ribs 350 and with varying wall thicknesses to improve strengths and to minimize stresses when pressurized, such as during operation when filled with compressed gas. The specific wall thickness may depend on the pressure requirements, such as operating pressure, and/or maximum burst pressure of the pressure vessels 322, 326.

Figure 8:
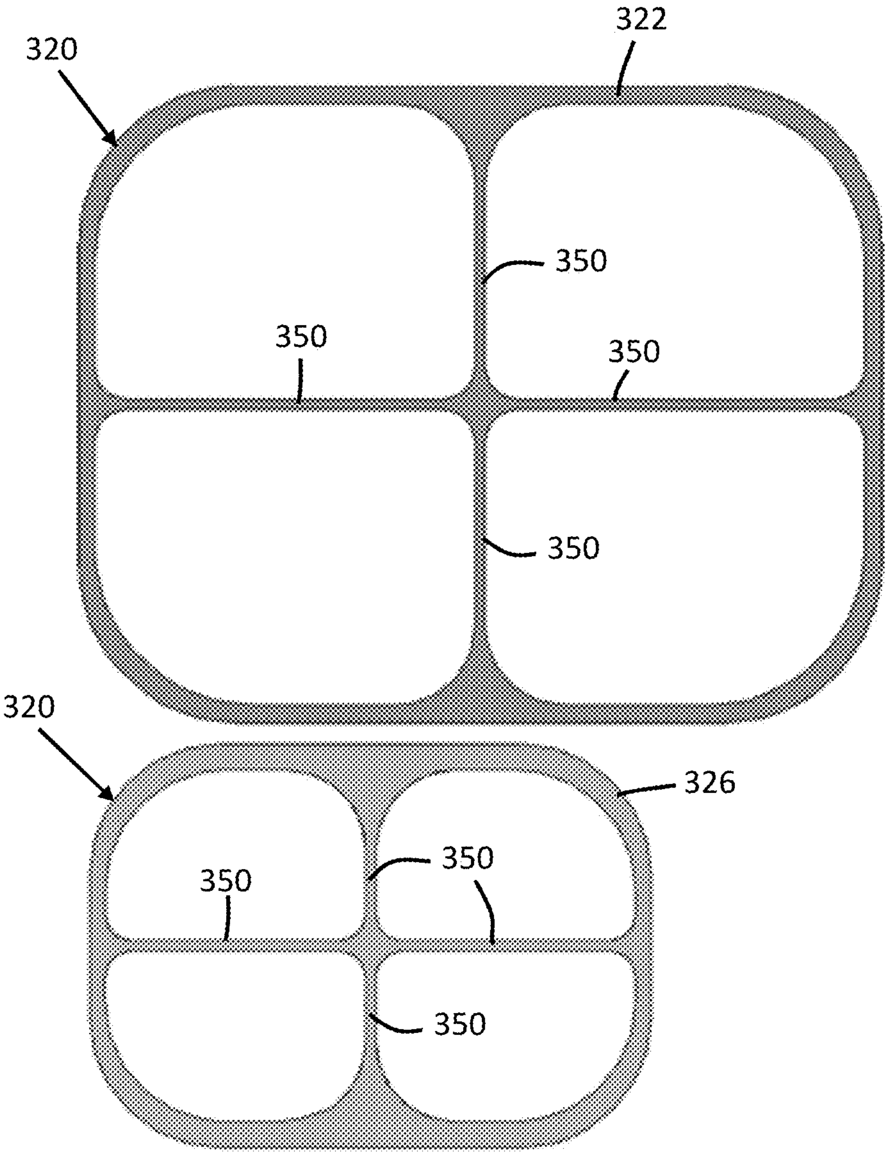
FIG. 8 is a dimensional drawing of an embodiment of a reservoir assembly with pressure vessels having rounded rectangle shaped cross-sections with stiffening ribs and with varying wall thicknesses.

Still referring to FIGS. 7A and 7B, the stiffening ribs 350 meet in the center of each of the pressure vessels 322, 326 and divide the interior volumes 324, 328 into four equal sections 352. In other words, one or more of the stiffening ribs 350 may extend outwardly from a center to a midpoint of an associated one of the generally flat sides of each of the pressure vessels 322, 326. The stiffening ribs 350 may take other forms or arrangements. FIG. 8 shows the reservoir assembly 320 with varying wall thicknesses. The design of the reservoir assembly 320 embodiment shown in FIGS. 7A-7B and FIG. 8A-8B provides for the design requirement volumes to be met within the packaging requirements. Alternatively or additionally, the sections 352 of the interior volumes 324, 328 may be joined in fluid communication with one another at one or more of the ends of the pressure vessels 322, 326 and within the caps 340. An example of this is illustrated in FIG. 9.

Figure 9:
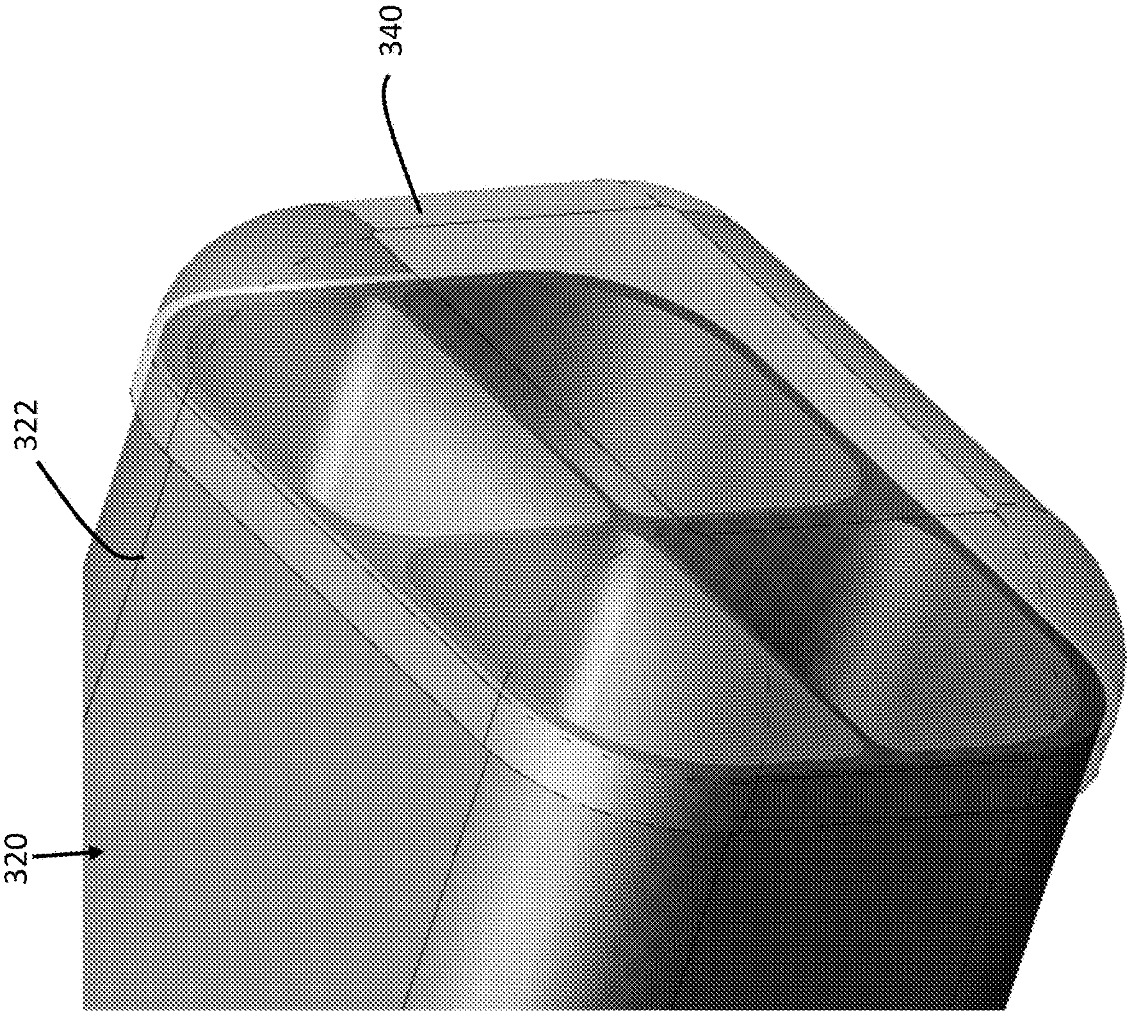
FIG. 9 is a perspective view of an end of a pressure vessel having a rounded rectangle cross-section with stiffening ribs and with a cap disposed thereupon.

FIG. 9 illustrates the reservoir assembly 320 embodiment shown in FIGS. 7A, 7B and FIG. 8 with a cap 340 to enclose an end of one of the pressure vessels 322, 326. Similar caps 340 may be installed on each of the ends of each of the pressure vessels 322, 326. The caps 340 preferably provide a tight fit on the pressure vessels 322, 326 with a gap that is configured to meet welding requirements and to provide a completely sealed joint. For example, the gap between each of the caps 340 and the corresponding one of the pressure vessels 322, 326 may be 1 mm or less. The ends of the pressure vessels 322, 326 may be machined to provide for a consistent and precise size and shape to allow for optimal fitting of the caps 340 thereupon. The caps 340 may be fitted and welded to enclose each of the pressure vessels 322, 326. One or more fittings (not shown in the FIGS.) may extend through one or both of the caps 340 on each of the pressure vessels 322, 326 to provide access to the interior volumes 324, 328 for charging and for discharging fluid therefrom.

Figure 10:
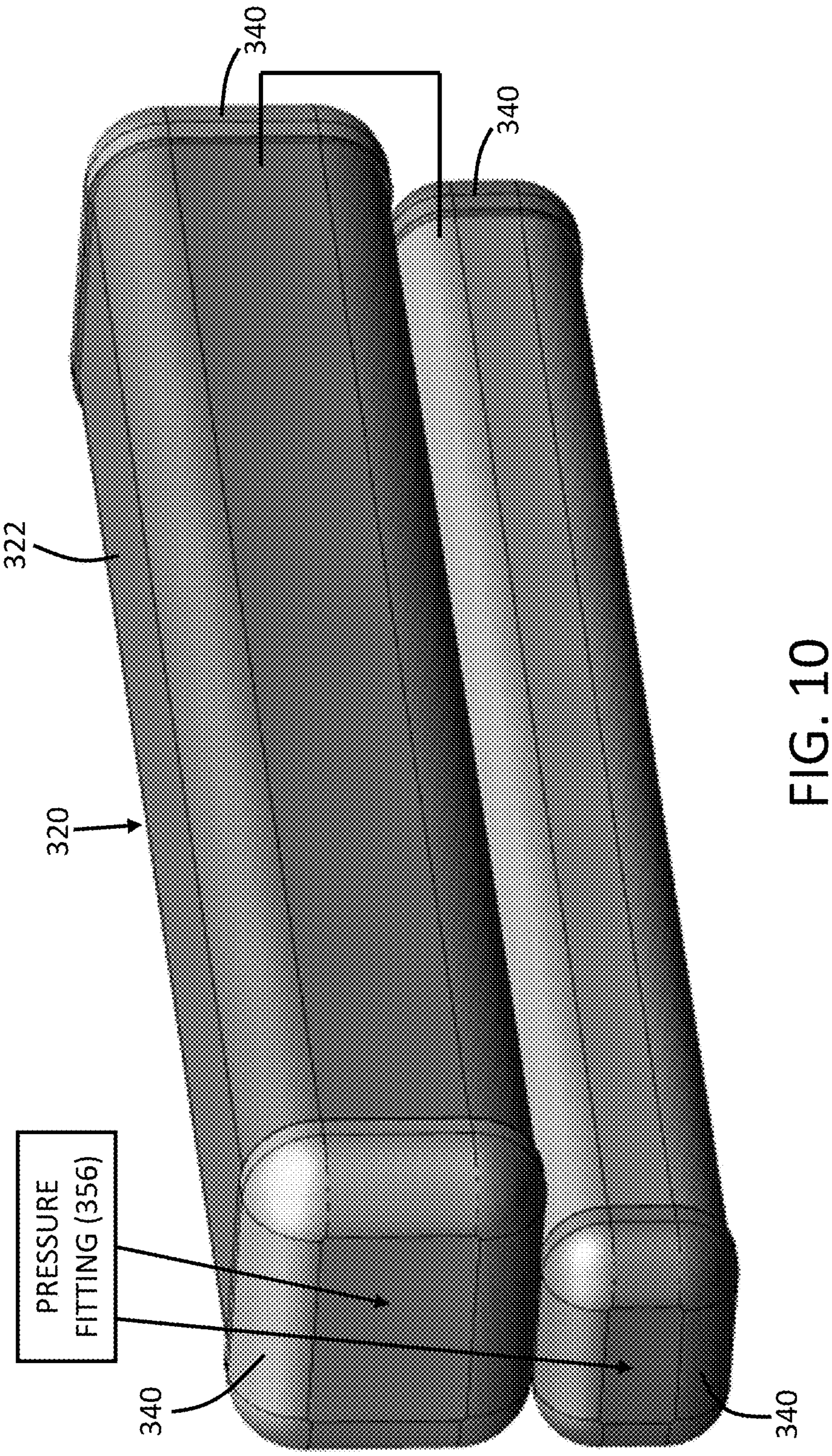
FIG. 10 is a perspective view of the of reservoir assembly embodiment with two pressure vessels each having rounded rectangle shaped cross-sections.

FIG. 10 shows the reservoir assembly 320 of FIGS. 7A-7B and FIGS. 8-9 in a more complete form. The pressure vessels 322, 326 of the reservoir assembly 320 may extend parallel and adjacent to one-another and may be welded or otherwise attached to one-another to provide the reservoir assembly 320 as a single unit. In other embodiments, the pressure vessels 322, 326 of the reservoir assembly 320 may be not directly attached to one another and may be independently secured to one or more portions of a larger structure. In the example embodiment shown in FIG. 10, the reservoir assembly 320 features two multi-void aluminum extrusions, each of which having two caps 340 of stamped aluminum that are fully welded to the respective one of the aluminum extrusions. One or both cap(s) 340 on each of the aluminum extrusions may have a pressure fitting 356 to provide fluid communication to the internal volume of the respective one of the aluminum extrusions. Furthermore, the pressure vessels 322, 326 of the reservoir assembly 320 shown in FIG. 10 define separate and independent volumes, with neither of the pressure vessels 322, 326 surrounding any part of the other one of the pressure vessels 322, 326.

Figure 11:
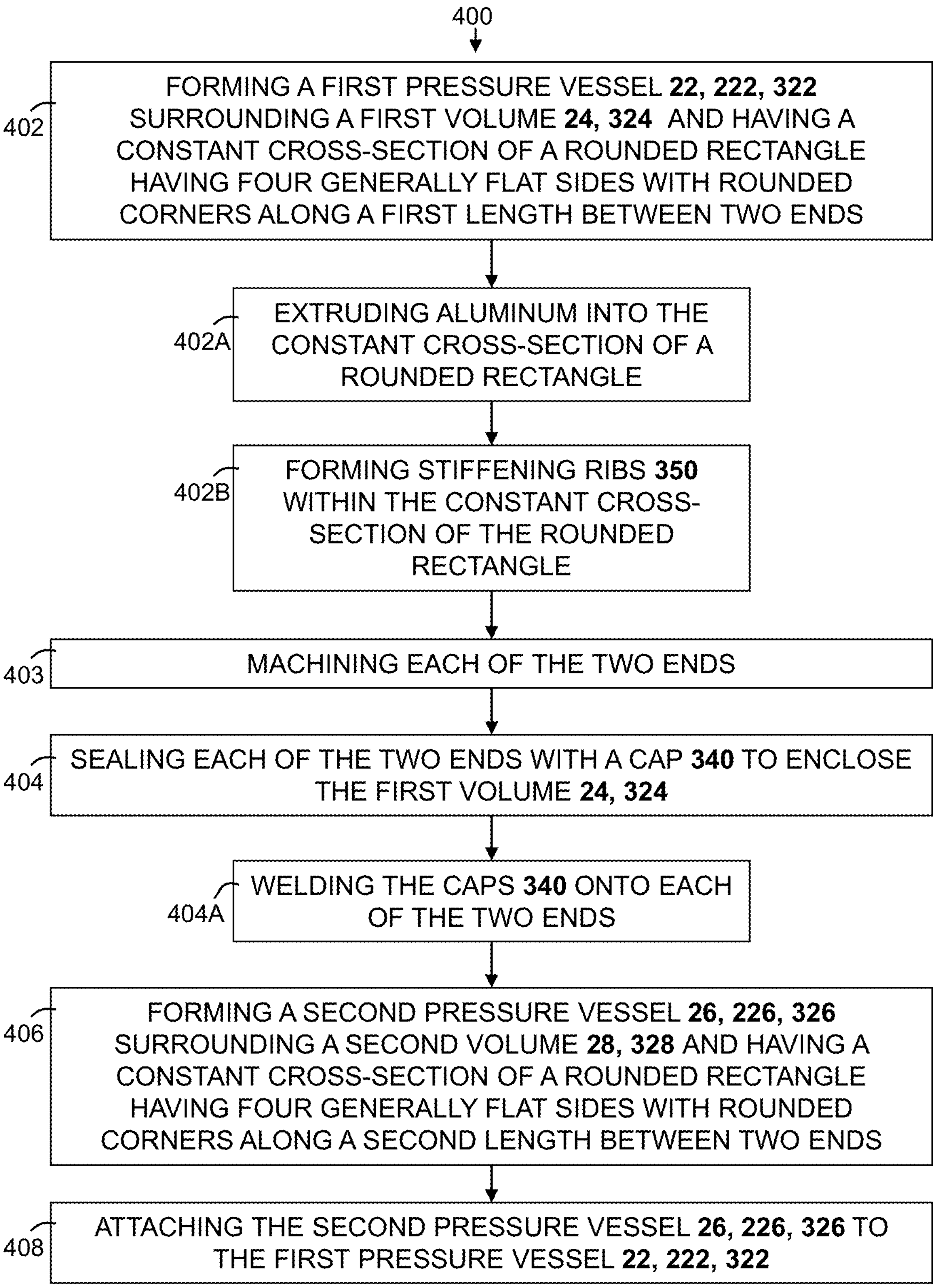
FIG. 11 is a flow chart of steps in a method of forming a reservoir assembly in accordance with some embodiments of the present disclosure.

A method 400 of forming a reservoir assembly 320 is shown in the flow chart of FIG. 11. The method 400 includes forming a first pressure vessel 22, 222, 322 surrounding a first volume 24, 324 and having a constant cross-section of a rounded rectangle having four generally flat sides with rounded corners along a first length between two ends at step 402. In some embodiments, the step of 402 forming the first pressure vessel 22, 222, 322 further includes extruding aluminum into the constant cross-section of a rounded rectangle at sub step 402A. In some embodiments, the step of 402 forming the first pressure vessel 22, 222, 322 further includes forming stiffening ribs 350 within the constant cross-section of the rounded rectangle at sub step 402B.

The method 400 also includes sealing each of the two ends with a cap 340 to enclose the first volume 24, 324 at step 404. In some embodiments, the step of 404 sealing each of the two ends with a cap 340 further includes welding the caps 340 onto each of the two ends at sub step 404A. In some embodiments, the method 400 further includes machining one or both of the two ends at step 403 prior to sealing each of the two ends with the caps 340 at step 404. For example, the surface profile of one or both of the two ends may be machined. This step 403 may be necessary as a result of tolerances in forming the first pressure vessel 22, 222, 322, such as extrusion tolerances that are not within the welding requirements and to provide a completely sealed joint.

The method 400 also includes forming a second pressure vessel 26, 226, 326 surrounding a second volume 28, 328 and having a constant cross-section of a rounded rectangle having four generally flat sides with rounded corners along a second length between two ends at step 406.

The method 400 also includes attaching the second pressure vessel 26, 226, 326 to the first pressure vessel 22, 222, 322 at step 408. The first pressure vessel 22, 222, 322 and the second pressure vessel 26, 226, 326 may be attached by welding or using an adhesive and/or with one or more fasteners. One or more brackets 236, braces, or other support structures may be used for coupling the pressure vessels 22, 222, 322, 26, 226, 326 together. It should be appreciated that the reservoir assembly 320 may include any number of the pressure vessels 22, 222, 322, 26, 226, 326 that may be attached and/or not attached to one another.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A reservoir assembly comprising:

a first pressure vessel surrounding a first volume and having a constant cross-section along a first length between two ends, wherein the constant cross-section defines a closed shape; and a second pressure vessel adjacent to the first pressure vessel and enclosing a second volume outside of the first volume, the second pressure vessel having a constant cross-section defining a closed shape and extending along a second length that extends parallel to the first length, wherein the first pressure vessel is larger than the second pressure vessel, wherein the first volume and the second volume are independent with neither of the first pressure vessel or the second pressure vessel surrounding any part of the other one of the first pressure vessel and the second pressure vessel, wherein the second pressure vessel is attached to the first pressure vessel by a bracket disposed therebetween and to define a constant cross-section of the reservoir assembly having an irregular shape configured to fit within a corresponding irregularly-shaped space having a first region with a first width and holding the first pressure vessel, and a second region with a second width that is smaller than the first width of the first region and which holds the second pressure vessel, wherein the bracket is integrally formed with both of the first pressure vessel and the second pressure vessel, as a single extrusion, and wherein the first pressure vessel is wider than the second width of the second region.

2. A reservoir assembly comprising:

a first pressure vessel surrounding a first volume and having a constant cross-section along a first length between two first ends, wherein the constant cross-section defines a closed shape; and a second pressure vessel adjacent to the first pressure vessel and enclosing a second volume outside of the first volume, the second pressure vessel having a constant cross-section defining a closed shape and extending along a second length that extends parallel to the first length, wherein the first pressure vessel is larger than the second pressure vessel, wherein the first volume and the second volume are independent with neither of the first pressure vessel or the second pressure vessel surrounding any part of the other one of the first pressure vessel and the second pressure vessel, wherein the second pressure vessel is attached to the first pressure vessel by a bracket disposed therebetween, wherein the first pressure vessel, the second pressure vessel, and the bracket together define a constant cross-section of the reservoir assembly extending entirely the first length between the two first ends and having an irregular shape configured to fit within a corresponding irregularly-shaped space having a first region with a first width and holding the first pressure vessel, and a second region with a second width that is smaller than the first width of the first region and which holds the second pressure vessel, and wherein the first pressure vessel is wider than the second width of the second region.

3. The reservoir assembly of claim 2, wherein at least one of the first pressure vessel or the second pressure vessel is formed of extruded metal.

4. The reservoir assembly of claim 3, wherein the first pressure vessel and the second pressure vessel are each formed of extruded metal.

5. The reservoir assembly of claim 2, wherein the constant cross-section of the first pressure vessel includes a stiffening rib within the first volume.

6. The reservoir assembly of claim 5, wherein the stiffening rib is one of a plurality of stiffening ribs within the first volume, with at least one of the plurality of stiffening ribs extending perpendicularly to another one of the plurality of stiffening ribs.

7. The reservoir assembly of claim 5, wherein the stiffening rib is one of a plurality of stiffening ribs within the first volume, with each of the stiffening ribs extending outwardly from a center of the constant cross-section of the first pressure vessel to divide the first volume of the first pressure vessel into equal sections.

8. The reservoir assembly of claim 5, wherein the constant cross-section of the first pressure vessel defines rounded rectangle having four generally flat sides with rounded corners along a first length between two first ends, and wherein the stiffening rib is one of a plurality of stiffening ribs within the first volume, with each of the stiffening ribs extending to a midpoint of an associated one of the generally flat sides.

9. The reservoir assembly of claim 2, wherein the first pressure vessel has a varying wall thickness.

10. The reservoir assembly of claim 2, further comprising a cap enclosing each of the two ends of the first pressure vessel for sealingly enclosing the first volume.

11. The reservoir assembly of claim 10, further comprising a pressure fitting disposed on one of the caps enclosing one of the two ends of the pressure vessel to provide fluid communication between the first volume of the first pressure vessel and the second volume of the second pressure vessel.

12. The reservoir assembly of claim 2, wherein the closed shape defined by at least one of the first pressure vessel and the second pressure vessel defines one of: a rounded rectangle having four generally flat sides with rounded corners, a circle, or an oval.

13. The reservoir assembly of claim 2, wherein the bracket is integrally formed with at least one of the first pressure vessel and the second pressure vessel.

14. The reservoir assembly of claim 2, wherein the first volume of the first pressure vessel is in fluid communication with the second volume of the second pressure vessel.

* * * * *